United States Patent Office 3,307,502
Patented Mar. 7, 1967

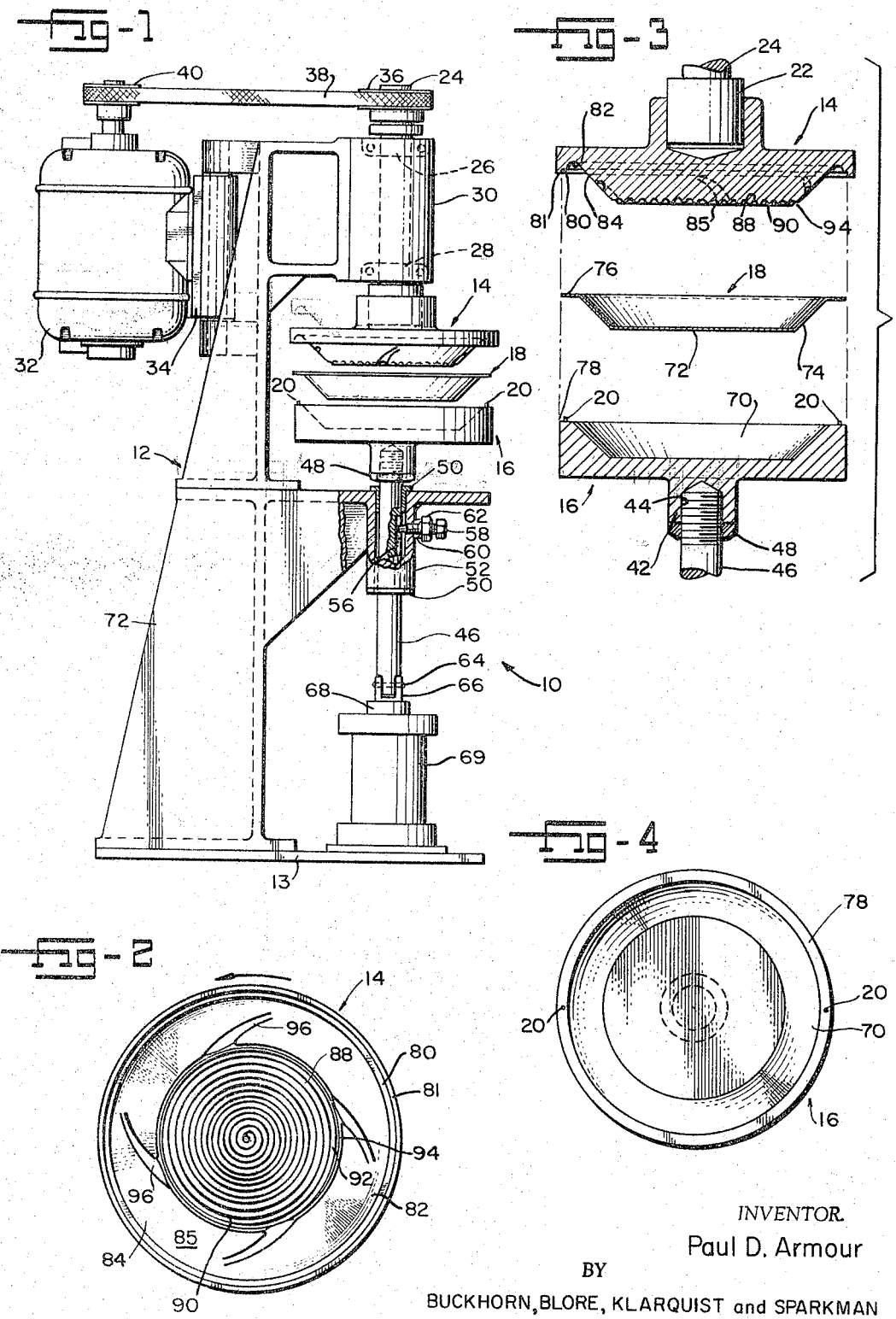

3,307,502
PIE SHELL FORMING UNIT
Paul D. Armour, Yamhill, Oreg., assignor to Bradley's Frozen Foods, Inc., Yamhill, Oreg., a corporation of Oregon
Filed Mar. 16, 1964, Ser. No. 352,266
8 Claims. (Cl. 107—15)

This invention relates to a pie shell forming unit, and more particularly to a unit for forming a graham cracker pie shell in a pan.

An object of the invention is to provide a new and improved pie shell forming unit.

Another object of the invention is to provide a unit for forming a graham cracker pie shell.

A further object of the invention is to provide a pie shell forming unit adapted to form pie shells quickly and uniformly.

Yet another object of the invention is to provide a unit for forming a pie shell from an amorphous mass of crust material in one simple operation.

Still another object of the invention is to provide a pie shell forming unit having a forming die adapted to project into a pie pan and provided with grooves on the bottom and sides thereof for feeding crust material in the pie pan radially outwardly and upwardly along the sides of the pie pan to form a shell.

The invention provides a pie shell forming unit including a lower pie pan supporting die adapted to move an upwardly facing pie pan up over the lower portion of an upper die. The upper die is rapidly rotated and has a crust material feeding groove on the bottom face thereof and has grooves extending along the tapered periphery thereof for feeding crust material radially outwardly of the pan and upwardly along the sides of the pan and onto the rim of the pan. Preferably there is a single spiral groove on the bottom face of the upper die which opens into an annular corner groove at the periphery of the die from which extend a plurality of spiral grooves extending upwardly along the tapered periphery of the upper die. The spiral grooves are spiraled in a direction such that when the upper die is rotated in a predetermined direction the spiral groove on the bottom of the upper die feeds the crust material radially outwardly along the bottom of the pie pan and the grooves in the periphery of the upper die advance the material upwardly along the sides of the pie pan and onto the rim of the pie pan to perfectly form the pie shell.

A complete understanding of the invention may be obtained from the following detailed description of a pie shell forming unit forming a specific embodiment thereof, when read in conjunction with the appended drawings, in which:

FIG. 1 is a partially sectional side elevation view of a pie shell forming unit forming one embodiment of the invention;

FIG. 2 is a bottom plan view of an upper forming die of the pie shell forming unit of FIG. 1;

FIG. 3 is an enlarged, fragmentary vertical sectional view of the pie shell forming unit of FIG. 1; and FIG. 4 is an enlarged, top plan view of a bottom forming die of the pie shell forming unit of FIG. 1.

Referring now in detail to the drawings, there is shown therein a pie shell forming unit 10 including a two-part stand 12 mounted on a base 13 supporting an upper, spinning die 14 and a lower, non-rotatable pressing die 16 which is adapted to move a pie pan 18 up to a position covering the lower portion of the upper spinning die 14 to mold pie dough or crust material into a crust or shell in the pan 18. The pan 18 preferably has holes therein adapted to fit over rounded pins 20 which key the pan 18 to the pressing die 16 and prevent rotation of the pan 18 with the upper, spinning die 14. The die 14 is press-fitted onto an enlarged end 22 of spindle 24. The spindle is mounted in radial and thrust bearings 26 and 28 carried by tubular portion cylindrical housing 30 of the stand 12 located at the upper end of the stand 12. An electric motor 32 carried by a motor support 34 on the stand 12 rotates a pulley 36 keyed to the spindle 24 through a belt 38 and a pulley 40, and rotation of the spindle rotates the spinning die 14 therewith in a counterclockwise direction, as viewed in FIG. 2.

The lower, pressing die 16 has a lower, central boss 42 provided with a tapped bore 44 into which is threaded a threaded end portion of a rod 46, and a lock nut 48 also threaded on the upper end of the rod 46 locks the pressing die 16 to the rod 46, and holds the pressing die 16 against rotation relative to the rod 46. The rod 46 extends slidably through flanged bushings 50 mounted in a cylindrical guide housing 52 of the stand 12 in positions in which the rod 46 is axially aligned with the spindle 24. The rod 46 has a splining groove 56 therein into which projects an end of a keying screw 58 threaded into a tapped bore in boss portion 60 of the housing 52 and held in place therein by a lock nut 62. The rod 46 is slidable along the housing 52, but is held by the screw 58 against rotation relative to the housing 52. The lower end of the rod 46 is connected by a pin 64 to a clevis 66 on the upper end of a piston rod 68 slidable in vertical cylinder 69, which may be a pneumatic or hydraulic type, and is mounted on the base 13 directly below the guide housing 52.

The die 16 has a cavity 70 therein complementary to bottom 72 and frustoconical peripheral or wall portion 74 of the pie pan 18, and rim 76 of the pie pan rests on annular land 78 of the die 16 so that the entire under surface of the pie pan is supported by the pressing die 16. The die 16 is adapted to press the pan 18 upwardly to a position in which the outer portion of the rim 76 of the pan 18 is pressed upwardly against the annular land forming the bottom of a groove 80, engaging the upper surface of the rim 76 to form a seal therewith to prevent the crust material from moving between the rim 76 and the annular land and the peripheral side of the groove 80. The die 14 also has an upper bead or rim forming annular groove 82, the inner side of which is defined by the upper portion of a frustoconical periphery 84 of a boss portion 85. The periphery 84 is of complementary shape to the inner, frustoconical peripheral portion 74 of the pan 18, but is of a lesser diameter. The boss portion 85 is concentric with the spindle 24. The bottom of the boss portion 85 has a spiral groove 88 covering the entire surface thereof, the spiral groove 88 extending in such a direction that the crust material is moved radially outwardly relative to the pan 18 as the die 14 is rotated in the direction of the arrow shown in FIG. 2. The groove 88 forms ridges 90 between adjacent turns thereof and opens at outer end 92 thereof into an annular corner groove or distributing channel 94 which acts as a passage for the crust material from the spiral groove 88 to lifting grooves 96. The lower ends of the grooves 96 open into the corner groove 94, and the grooves 96 spiral backwardly and upwardly along the frustoconical periphery of the boss portion 85. The groove 88 is generally semi-cylindrical in transverse cross section so that the trailing wall thereof provides an excellent feeding action on the crust material entering this groove. The grooves 96, at their lower ends, are quite deep and taper to no depth at all just adjacent the bead-forming groove 82. The grooves 96 also taper in width from wide at their lower ends to narrow at the upper ends thereof.

Operation

To form a pie crust, the operator of the unit 10 places the pie pan 18 in the recess 70 in the pressing die 16, with the rim 76 of the pan in keying engagement with the pins 20 which have rounded ends for easy insertion. The operator then actuates a valve (not shown) to supply fluid under pressure into the lower end of the cylinder 69, which raises a piston (not shown) and the piston rod 68 upwardly to move the rod 46 upwardly. The operator places the desired quantity of the graham cracker pie crust material in the bottom of the pan 18, preferably in a flat layer, but permissibly in an amorphous mass or lump, the mass containing graham cracker crumbs, butter, glycerine and salt. The die 16 is urged by the cylinder 69 upwardly until the outer portion of the rim 76 is urged against the bottom of the peripheral groove 80. The die 14 is rotated, and the grooves 88 feed the material of the crust material radially outwardly in the pan 18 to the corner channel 94, and upwardly along the frustoconical periphery 74 and into the grooves 96, which feed the material upwardly into the bead or rim forming groove 82 so that the dough fills the entire space between the pan 18 and the portion of the die 14 enclosed thereby. The die 16 is held in the closed position relative to the die 14 for sufficient period of time for the grooves 88 and 96 to spread the pie crust material completely and for the grooves 88, 96 to substantially clear themselves of the pie crust material. Then the operator actuates the valve to cause the cylinder 69 to lower the die 16 back to its lowermost position, as illustrated in FIG. 1. Another pie shell then may be formed in a similar manner.

The above described pie shell forming unit 10 rapidly and uniformly forms each pie shell without any waste of the crust material. The grooves 88 and 96 rapidly and efficiently move the crust material outwardly and upwardly in the pan 18 to efficiently form the pie shell.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a pie shell forming unit,
a lower die having an upwardly facing recess for receiving a pie pan and a first annular land for supporting the rim of the pie pan,
an upper die having a boss portion adapted to fit spacedly into the lower die concentrically therewith,
the boss portion having a spiral spreading groove extending outwardly from the central portion of the bottom thereof, a lower annular groove at the bottom peripheral portion thereof and a plurality of lifting grooves extending upwardly and partially around the peripheral portion of the boss portion from the annular groove,
the lifting groove being deep at its lower end and shallow at its upper end,
the upper die having a downwardly facing, bead-forming annular groove surrounding the boss portion, an annular notch outside of the bead-forming annular groove and a second annular land outside of the annular notch and opposing the first annular land,
means for moving the lower die and a pie pan fitting into the recess upwardly over the boss portion to a position in which a rim of the pie pan abuts the bottom of the annular notch and the pie pan is spaced from the bottom and periphery of the boss portion,
means for holding the pie pan against rotation relative to the lower die,
and means for rotating the upper die relative to the pie pan and the lower die in a direction in which the spiral spreading groove engages and spreads crust material in the bottom of the pan radially outwardly to the space between the peripheries of the boss portion and pie pan and to and through the lower annular groove into the lifting grooves and the lifting grooves raise the crust material into the bead-forming groove.

2. In a pie shell forming unit,
a lower die having an upwardly facing recess for receiving a pie pan and a first annular land for supporting the rim of the pie pan,
an upper die having a boss portion adapted to fit spacedly into the lower die concentrically therewith,
the boss portion having a spiral spreading groove extending outwardly from the central portion of the bottom thereof and a plurality of lifting grooves extending upwardly and partially around the peripheral portion of the boss portion,
the lifting groove being deep at its lower end and shallow at its upper end,
the upper die having a downwardly facing, bead-forming annular groove surrounding the boss portion, an annular notch outside of the bead-forming annular groove and a second annular land outside of the annular notch and opposing the first annular land,
means for moving the lower die and a pie pan fitting into the recess upwardly over the boss portion to a position in which a rim of the pie pan abuts the bottom of the annular notch and the pie pan is spaced from the bottom and periphery of the boss portion,
means for holding the pie pan against rotation relative to the lower die,
and means for rotating the upper die relative to the pie pan and the lower die in a direction in which the spiral spreading groove engages and spreads crust material in the bottom of the pan radially outwardly to the space between the peripheries of the boss portion and pie pan and into the lifting grooves and the lifting grooves raise the crust material into the bead-forming groove.

3. In a pie shell forming unit,
a lower die for holding a pie pan having a flat bottom and a peripheral side wall of a predetermined shape,
an upper die having a boss portion shaped to fit into such a pie pan and define a pie shell cavity therewith,
means for rotating the upper die relative to a pie pan held by the lower die,
means for effecting relative movement of the dies toward and away from each other,
the boss portion of the upper die having a spiral groove on the bottom face thereof and a plurality of lifting grooves on the periphery thereof extending upwardly from the bottom of the periphery thereof and also extending partially around the periphery thereof.

4. The pie shell forming unit of claim 3 wherein the lifting grooves taper from predetermined wide and deep transverse dimensions at the lower ends thereof to narrow and shallow transverse dimensions at the upper ends thereof.

5. The pie shell forming unit of claim 3 wherein the spiral groove extends in closely spaced convolutions to the periphery of the boss portion and defines narrow spiral ridges between adjacent convolutions.

6. The pie shell forming unit of claim 5 wherein the spiral groove is substantially semicylindrical in cross section.

7. The pie shell forming unit of claim 3 wherein the boss portion has an annular groove at the bottom of the periphery thereof serving to connect the spiral groove and the lower ends of the lifting grooves.

8. In a pie shell forming unit,
a lower die for holding a cup-shaped pie pan,
an upper die having a boss portion adapted to fit loosely in such a pie pan,
the boss portion having a spiral groove in the bottom extending from the central portion thereof in a plurality of revolutions to the outer periphery of the boss portion,
means for rotating the upper die relative to the pie pan, and means for effecting relative closing and opening movements between the dies.

References Cited by the Examiner

UNITED STATES PATENTS

| | | | |
|---|---|---|---|
| 1,937,290 | 11/1933 | Mears | 107—15.9 |
| 2,624,296 | 1/1953 | Nuttall | 107—15.9 |
| 3,190,758 | 6/1965 | Hauf | 107—15.9 X |
| 3,202,114 | 8/1965 | Cameron et al. | 107—54.28 |
| 3,203,368 | 8/1965 | Cooper et al. | 107—15.9 |

FOREIGN PATENTS

| | | |
|---|---|---|
| 309,695 | 4/1929 | Great Britain. |
| 590,569 | 7/1947 | Great Britain. |

BILLY J. WILHITE, *Primary Examiner.*